United States Patent [19]

Sugi

[11] Patent Number: 5,530,893
[45] Date of Patent: Jun. 25, 1996

[54] SYSTEM FOR SELECTIVELY COMMUNICATING INFORMATION BETWEEN PROCESSOR AND BUILT-IN KEYBOARD AND EXTERNAL INPUT MEANS

[75] Inventor: Haruo Sugi, Machida, Japan

[73] Assignee: International Business Machines Corporation, Armonk, N.Y.

[21] Appl. No.: 257,395

[22] Filed: Jun. 9, 1994

[51] Int. Cl.$^6$ ........................................... G06F 15/02
[52] U.S. Cl. ................ 395/825; 340/825.5; 364/234; 364/234.4; 364/238.2; 364/DIG. 2; 364/709.01; 395/838
[58] Field of Search ................ 340/825.5, 234; 364/200, 709.06, 709.09, 234, 234.4, 238.2; 395/275

[56] References Cited

U.S. PATENT DOCUMENTS 4,872,004  10/1989  Bahnick et al. ..................... 395/275
4,959,774  9/1990  Davis .................................... 364/200
5,111,424  5/1992  Donaldson et al. ................. 395/725
5,136,694  8/1992  Belt et al. ............................. 395/275

OTHER PUBLICATIONS

Martin Reiffin "A Real-Time Compiler System" Microcomputing, Jul. 1983, pp. 52–63.

Primary Examiner—Thomas C. Lee
Assistant Examiner—Terance Stanton
Attorney, Agent, or Firm—Douglas W. Cameron

[57] ABSTRACT

A data processing system having a built-in keyboard and an external input device which are alternately activated. If there is no command from the external keyboard (106), the external keyboard is invalidated (108). If there is a command from the built-in keyboard, it is transmitted to the CPU (110–114). If there is a command from the external keyboard (106) and the command is RESEND a previous command is transmitted to the CPU. If the command is not RESEND, the command from the external keyboard is transmitted to the CPU.

9 Claims, 5 Drawing Sheets

SYSTEM FOR SELECTIVELY COMMUNICATING INFORMATION BETWEEN PROCESSOR AND BUILT-IN KEYBOARD AND EXTERNAL INPUT MEANS

DESCRIPTION

1. Technical Field

This invention relates to a data processing system and a communication method for data processing.

2. Description of the Prior Art

Conventionally, a keyboard is integrally incorporated into the housing of a small computer, such as palm top and sub-note type computers. Because the keytops of such a built-in keyboard is usually small in size and poses difficulty in operation, there is sometimes a demand for attachment of a larger external keyboard for improvement in operability.

To meet such demand, a small computer has been recently introduced which not only has a built-in keyboard but also is connectable to an external keyboard. However, because it is difficult to control contention between the data input from the built-in keyboard and the external keyboard, conventional small computers employed an interface logic to invalidate the built-in keyboard while the external keyboard is attached.

Recently, there has arisen a demand to connect a bar code reader to the external keyboard interface in order to use it for inventory control or the like. In this case, the bar code reader is designed to generate scan codes similar to those generated from the external keyboard.

However, as described above, because an interface logic has conventionally been employed to invalidate the built-in keyboard when the external keyboard (input device) is attached, the built-in keyboard cannot be used in a state where the bar code reader is attached. Therefore, there is an inconvenience in that, for example, such an operation as typing in a quantity of items with the built-in keyboard while scanning and reading bar codes on the items with the bar code reader is completely impossible.

U.S. patent application Ser. No. 953,613 filed Sep. 26, 1992 assigned to the assignee of this patent application discloses an apparatus for controlling a single cursor by using a plurality of input devices in which the control of the single cursor by a plurality of input devices is attained by disposing a selection controller between a single mouse port and a series of mouse-like devices. In this case, each of the mouse-like devices receives signals from the computer system, and sends signals to the computer system. However, these signals are transferred to the computer system through the selection controller. That is the selection controller serves as a switch which selects which mouse-like device is connected to the input port of the computer system. The invention according to this U.S. patent application uses a single mouse port, and cannot be applied to a controller which connects a plurality of separate keyboards as described above. In addition, the mouse port is usually a serial port, and completely different from a keyboard interface generating scan codes.

SUMMARY OF THE INVENTION

Accordingly, this invention has been conceived under such circumstances, and is intended to provide a data processing system which can alternatively or simultaneously validate (activate) a built-in keyboard and an external input device, as required, when the external input device is attached, as well as a communication method for such data processing.

The invention set forth is a data processing system comprising a processor for processing data, and a controller connected to said processor through a system bus, connected to a built-in keyboard through a first interface, and to an external input means through a second interface wherein said controller comprises a validating means for validating said external input means in response to the absence of both data and a command from said processor to said built-in keyboard, a first data transmission means receiving data or a command from said external input means and transmitting it to said processor in response to the presence of either data or a command from said external input means in a state where said external input means is validated, an invalidating means invalidating said external input means in response to the absence of both data and a command from said external input means in a state where said external input means is validated, and a second data transmission means transmitting data or a command from said built-in keyboard in response to presence of either data or a command from said built-in keyboard.

The invention set forth is a data processing system recited further comprising a housing provided with said built-in keyboard, and incorporating said processor and controller therein, and a connecting means for removably connecting said external input means to the controller in said housing.

The invention set forth is a data processing system recited, wherein said first interface is a parallel interface, said second interface being a serial interface.

The invention set forth is a data processing system recited, wherein said external input means is one of either and external keyboard, a bar code reader, or a card reader.

The invention set forth is a data processing system recited, wherein said external input means has a buffer for once storing data to be transmitted, and retransmits the stored data in response to a retransmit request command from said keyboard controller.

The invention set forth is a data processing system recited, wherein a command sent to said processor is one other than the retransmit request command which requests the retransmission of at least one of either data or a command.

The invention set forth is a communication method for data processing between a data processing system, which comprises a processor for processing data, and a controller connected to a built-in keyboard through a first interface and to an external input means through a second interface, and the external input means connected to said controller through said second interface, wherein said controller validates said external input means in response to the absence of both data and a command from said processor to said built-in keyboard, receives data or a command from said external input means and transmits it to said processor in response to the presence of either data or a command from said external input means in a state where said external input means is validated, as well as invalidates said external input means in response to the absence of both data and a command from said external input means, and transmits data or a command from said built-in keyboard in response to the presence of either data or a command from said built-in keyboard.

The invention set forth is a communication method for data processing recited, wherein, when said controller receives a command or data other than the retransmit request command which requests it to retransmit at least one of either data or a command, the controller transmits the command or data received as it is to said external input means, and when it receives from said external input means one of either a command or data other than the retransmit request command, it transmits the command or data received as it is to the processor.

The invention set forth is a communication method for data processing recited, wherein, in transmitting a command from said processor to said external input means, said controller translates the received keyboard command by utilizing the idle time resulting from the time difference in communications to said built-in keyboard and said external input means, and executes it for the built-in keyboard.

The invention set forth is a communication method for data processing recited, wherein, when said processor transmits a retransmit request command which requests the retransmission of at least one of either data or a command, said controller retransmits the one of either the data or a command which was previously transmitted to said processor, and when said external input means transmits a retransmit request command, it retransmits the one of either data or a command which was previously transmitted to said external input means.

The invention set forth is a communication method for data processing recited, wherein, when said controller fails to take in one of either data or a command from said processor, it transmits a retransmit request command to said processor which requests the retransmission of at least one of either data or a command. When it fails to reliably receive one of either data or command from said external input means, it transmits a retransmit request command to said external input means.

As described above, according to this invention, since the built-in keyboard and the external keyboard can be alternatively or simultaneously enable, as required, it provides significant advantages over the prior art particularly when the external input means is a bar code reader which reads the product number of items (bar code) and keying-in of quantity of the items to be ordered can be performed almost simultaneously, so that a small computer with a built-in keyboard can be used for warehouse control or the like.

OPERATION

The external input means and the built-in keyboard is alternatively selected, as required, because the controller set forth comprises a validating means for validating the external input means in response to the absence of both data and a command from the processor to the built-in keyboard, a first data transmission means receiving data or a command from the external input means and transmitting it to the processor in response to the presence of either data or a command from the external input means in a state where the external input means is validated, an invalidating means invalidating the external input means in response to the absence of both data and a command from the external input means in a state where the external input means is validated, and a second data transmission means transmitting data or command from the built-in keyboard in response to presence of either data or command from the built-in keyboard.

According to the invention set forth, the external input means can be removably connected to the controller in the housing by the connection means so that various external input means such as an external keyboard or a bar code reader can be attached.

According to the invention set forth, the first interface of a parallel interface and the second interface is a serial interface so that the communication of commands and data carried out between the controller and the built-in keyboard becomes parallel, while the communication of commands and data carried out between the controller and the external input means becomes serial. Thus, when communications are performed based on the same command from the processor, a time difference arises between them, and the controller can utilize the idle time resulting from the time difference in communications to execute the processing for the built-in keyboard. Therefore, it is possible to simultaneously validate the built-in keyboard and the external input means.

According to the invention set forth, if the external input means is an external keyboard, the built-in keyboard and the external keyboard can be alternately used while they are attached to the controller.

If the external input means is a bar code reader, it is possible to read bar codes representing product numbers or the like with the bar code reader, while to key in quantities of goods with the built-in keyboard.

If the external input means is a card, it is possible to enter information without troublesome key operation by reading, for example, an ID card with a card reader, by it is also possible to enter such information by keyboard if necessary.

According to the invention set forth, if the controller fails to receive a command or data from the external input means, the command or data stored in the buffer is retransmitted from the external input means by the controller issuing a retransmit request command so that the controller can reliably receive the command or data.

According to the invention set forth, a command being transmitted to the processor is one other than a retransmit request command which requests retransmission of one of either data or a command so that the retransmit request command can be specially handled.

According to the invention set forth, the external input means and the built-in keyboard are alternatively selected, as requested, because the controller validates the external input means in response to the absence of both data and a command from the processor to the built-in keyboard, receives data or a command from the external input means and transmits it to the processor in response to the presence of either data or a command from the external input means in a state where the external input means is validated, as well as invalidates the external input means in response to the absence of both data and a command from the external input means, and transmits data or command from the built-in keyboard in response to the presence of either data or a command from the built-in keyboard.

According to the invention set forth, the controller transmits the command or data other than the retransmit request command received from the processor to the external input means as it is, and transmits the command or data other than the retransmit request command received from the external input means to the process as it is so that it is possible to prevent confusion between a case where transmission is unsuccessful in transmitting a command from the controller to the processor or the external input means and cases other than that.

According to the invention set forth, in transmitting a command or data from the processor to the external input means, the controller translates the received keyboard command by utilizing the idle time resulting from the time difference in communications to the built-in keyboard and the external input means, and executes it for the built-in keyboard so that it can simultaneously validate (activate) the built-in keyboard and the external input means.

According to the invention set forth, when the processor transmits a retransmit request command, the controller retransmits the data or command which was previously transmitted to the processor, and when the external input means transmits a retransmit request command, it retransmits the data or command which was previously transmitted to the external input means so that the controller can reliably transmit a command or data to the processor or the external input means.

According to the invention set forth, when the controller fails to take in one of either data or a command from the processor, it transmits a retransmit request command to the processor. When it fails to surely receive one of data or command from the external input means, it transmits a retransmit request command to the external input means so that the controller can reliably receive a command.

Description of Symbols 10 computer (data processing system)
18 built-in keyboard
20 external keyboard (external input means)
22 CPU (processor)
24 system bus
28 keyboard controller (controller)
32 first interface
34 second interface

DESCRIPTION OF THE PREFERRED EMBODIMENT

Now, the first embodiment of this invention will be explained with reference to FIGS. 1 through 4 in the following.

Figure 1:
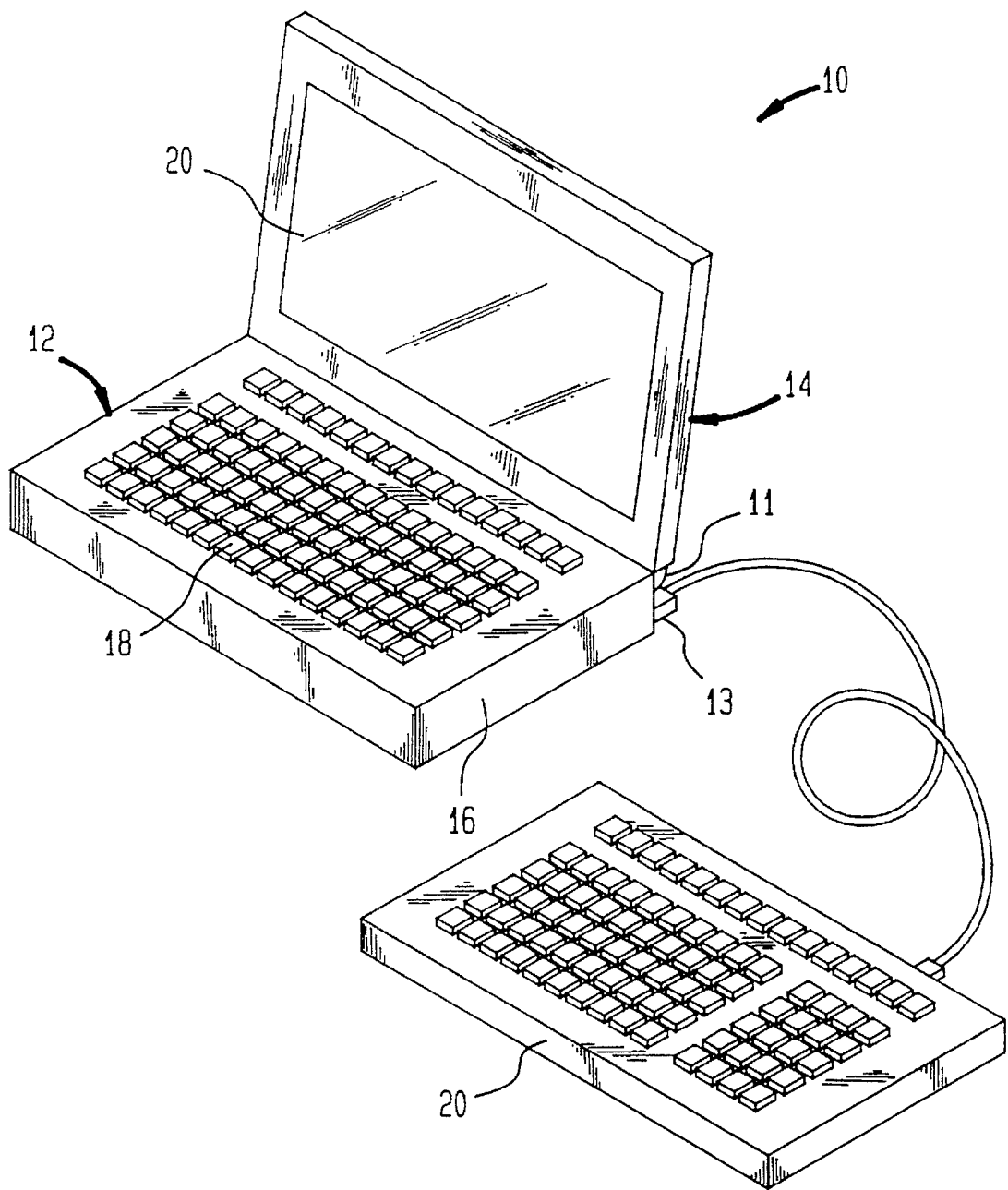
FIG. 1 is a perspective view showing the first embodiment of this invention.

Referring to FIG. 1, there is shown a computer system 10 as a data processing system for the first embodiment of the present invention.

This computer system 10 is a so-called sub note (small notebook) type computer which has a body 12 of a rectangular shape in its plain view, and a cover 14 rotatably mounted so as to be opened or closed on the body through a hinge 11 along the longer side of the body the other end of which is not shown.

This computer system 10 is a so-called sub note (small notebook) type computer which has a body 12 of a rectangular shape in its plan view, and a cover 14 rotatably mounted so as to be opened or closed on the body through a hinge 11 along the longer side of the body the other end of which is not shown.

The body 12 has a thin housing 16 of a rectangular shape in its plan view, and a built-in keyboard 18 incorporated with the housing 16. In addition, the housing 16 contains a central processing unit (CPU) as a processor described later, a memory consisting of RAMs and ROMs, and a keyboard controller.

The body 12 is detachably attached to an external keyboard 20 as an external input means through a connector 13 provided on the rear face of the body.

The cover 14 is provided with a display 20 consisting of a liquid crystal display.

Figure 2:
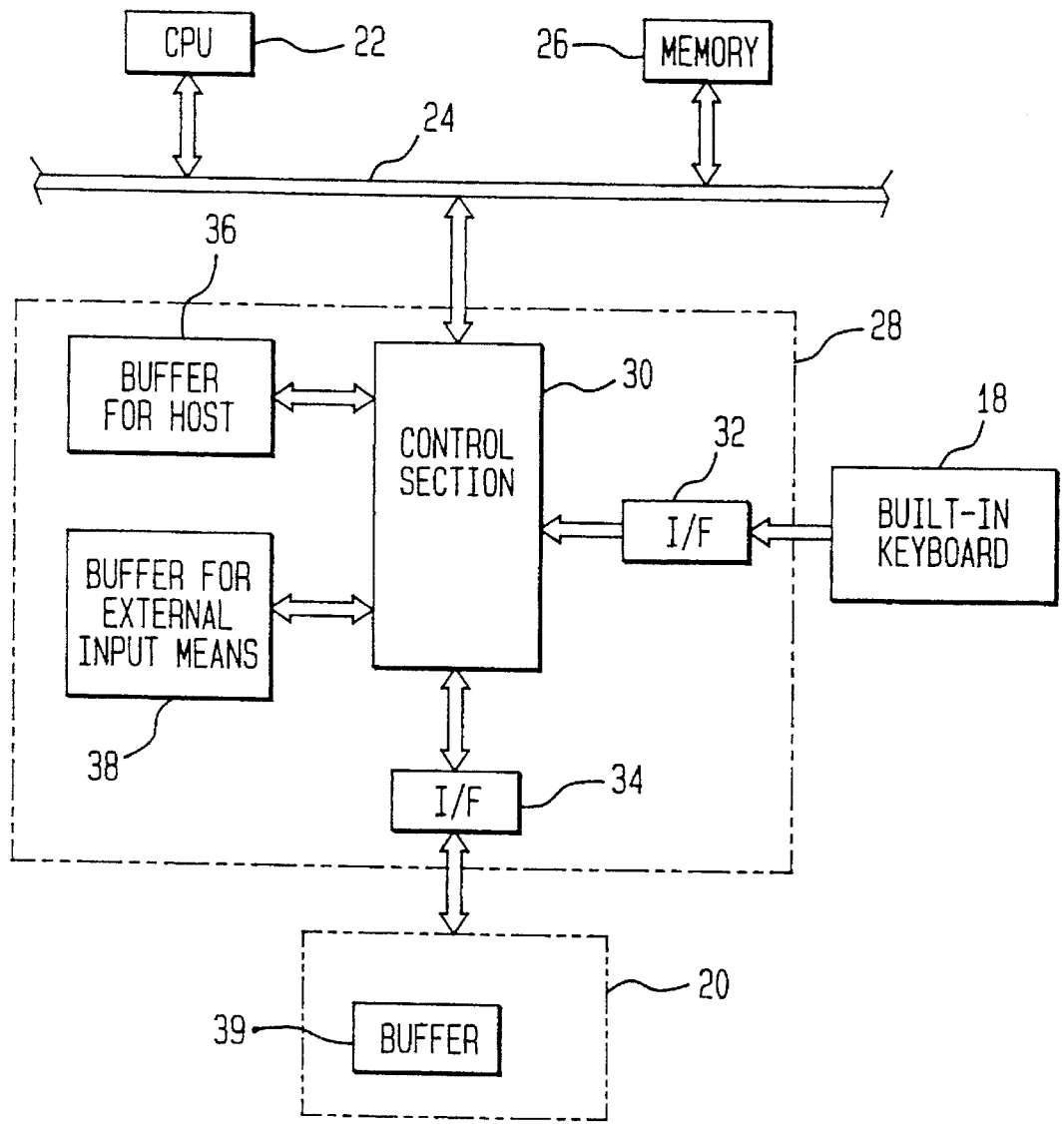
FIG. 2 is a block diagram showing major portions of the first embodiment.

FIG. 2 shows a block diagram of the arrangement of the major portions of the first embodiment according to this invention.

In FIG. 2, the CPU 22 is connected with the memory 26 and a keyboard controller 28 as the controller through a system bus 24.

Of them, the keyboard controller 28 comprises a control unit 30 connected to the CPU 22 through the system bus 24, as well as a first interface 32, a second interface 34, a buffer for host 36, and a buffer for external input means 38, all of which are coupled to the control unit 30 through bus lines. The keyboard controller 28 is actually composed of a so-called one-chip microcomputer.

The first interface 32 is connected to the built-in keyboard 18 through bus lines. This first interface 32 is provided for matching between the built-in keyboard 18 and the control unit 30, and is composed of a parallel interface for transmitting and receiving data or commands in the form of parallel signals. Thus, the control section 30 can receive in a short period of time scan codes generated by the built-in keyboard 18.

The second interface 34 is connected to the external keyboard 20. It is provided for matching between the external keyboard 20 and the control section 30, and is composed of a serial interface. Thus, the transmission of command from the control section 30 to the external keyboard 20, or from the external keyboard 20 to the control section 30, is performed in serial communication.

The control section 30 has the capability to arbitrate communication of commands or data between the built-in keyboard 18, the external keyboard 20, and the CPU 22, as well as other capabilities. The major control operation of this control section 30 will be described later.

The buffer for host 36 is one for temporarily storing commands or data when the control section 30 sends to the CPU 22 such commands or data sent from the built-in keyboard 18 or the external keyboard 20.

The buffer for external input means 38 is one for temporarily storing commands or data when the control section sends such commands or data sent from the CPU to the bar code reader.

The external keyboard 20 is provided with a buffer 39 for once storing commands or data to be sent out. The external keyboard 20 has a function to retransmit the data or commands stored in the buffer 39 when it receives a RESEND command, which is a retransmit request command requesting retransmission of data or commands from the control section 30.

Figure 3:
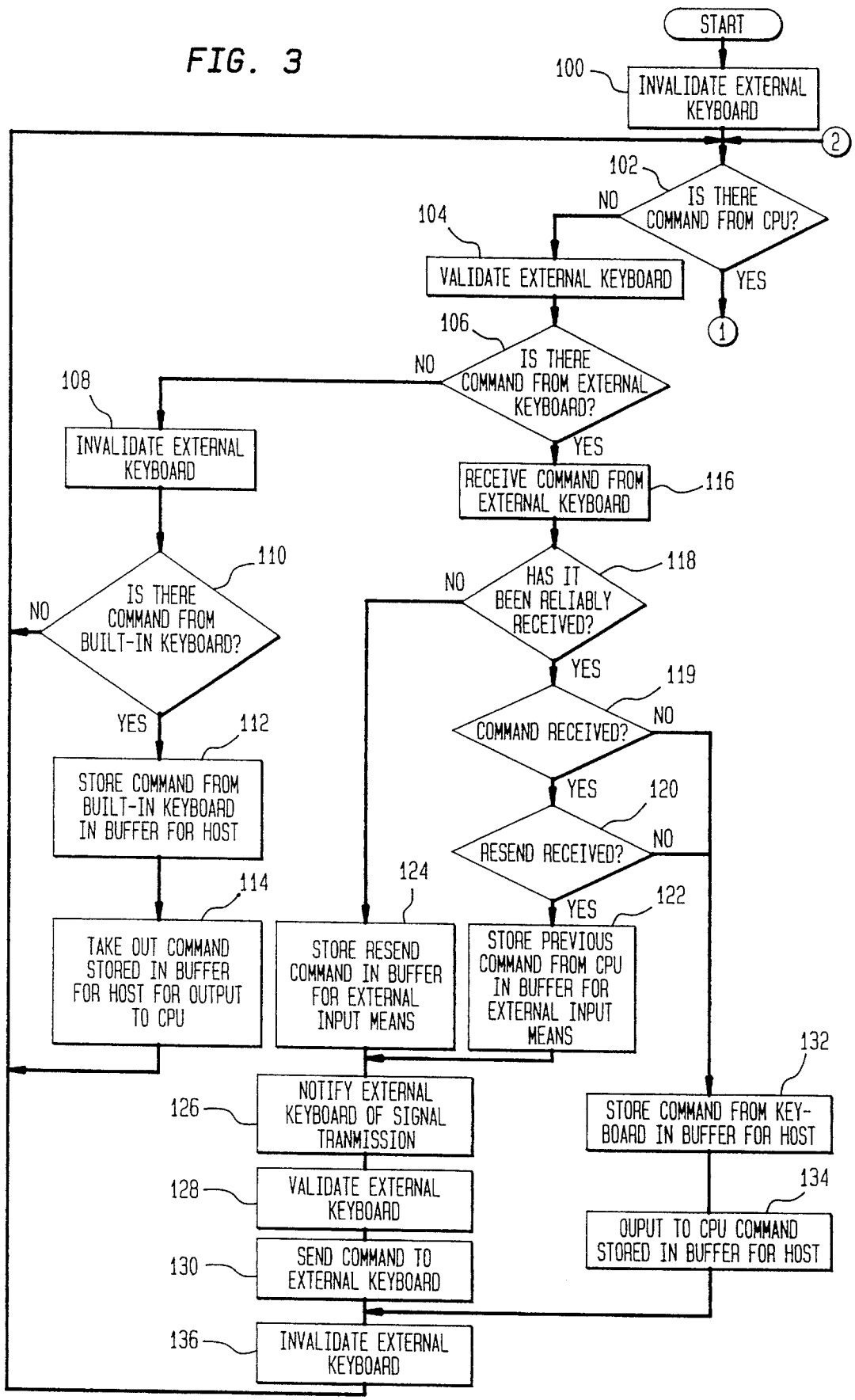
FIG. 3 is a part of flowchart illustrating major control algorithm of the keyboard controller in FIG. 2.
Figure 4:
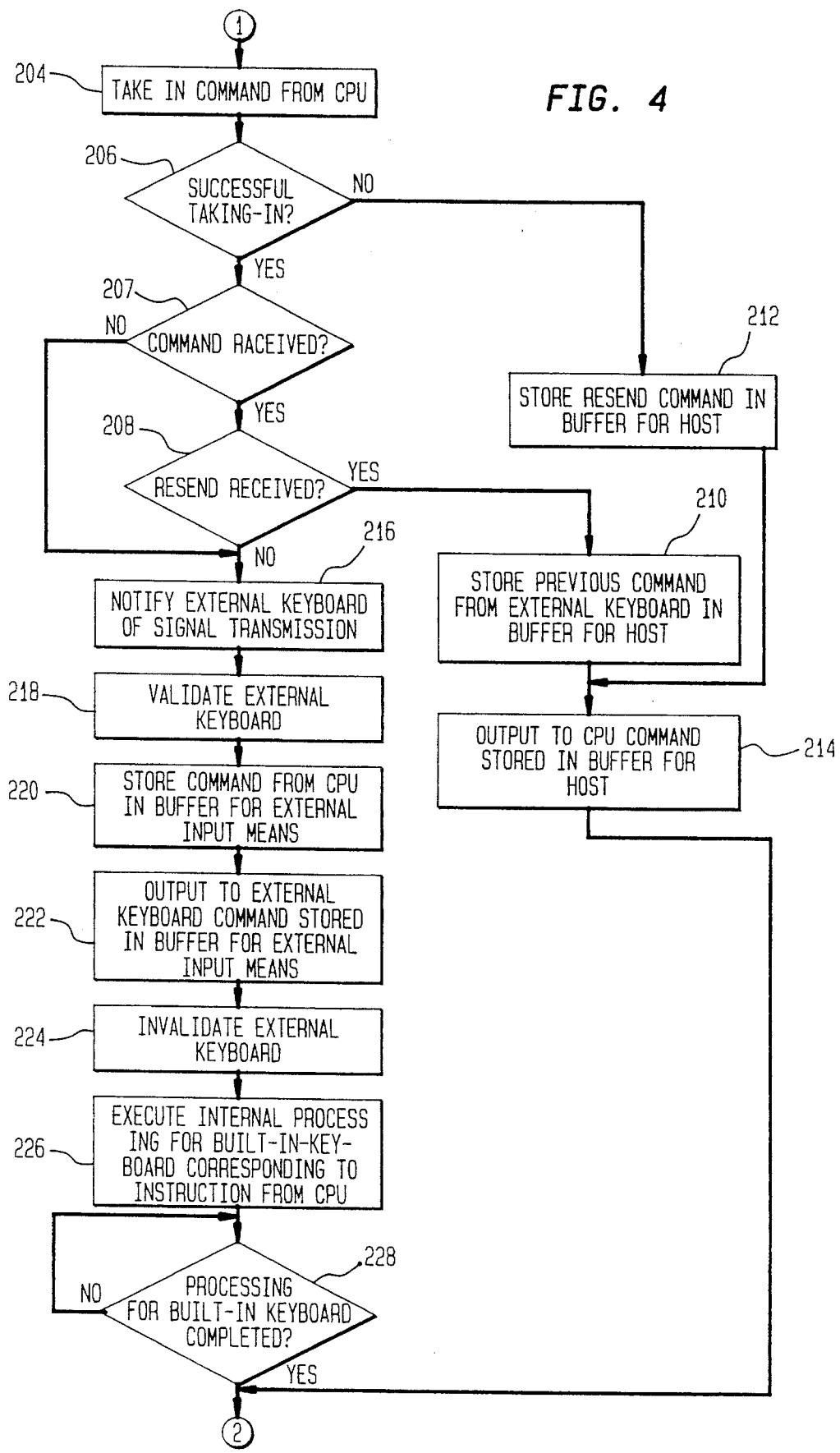
FIG. 4 is a remaining part of flowchart illustrating major control algorithm of the keyboard controller in FIG. 2.

The major control algorithm of the control section 30 is hereinafter described with reference to the flowcharts shown in FIGS. 3 and 4. In these figures, for the convenience of illustration, the term "command" is used, but this actually means commands and data including the RESEND command, or commands and data other than RESEND command.

The control algorithm corresponding to these flowcharts is stored in a ROM in the control section 30 which is not shown.

First, in step 100, as initialization, the external keyboard 20 is invalidated as the external input means. The term of "invalidation" means that the external keyboard 20 is disabled for communication, or that the external keyboard 20 is inactivated. Thus, no data is entered even if the external keyboard 20 is operated.

The next step 102 determines whether there is data or commands, including the retransmit request command RESEND from the CPU 22. If there is neither data nor a command from the CPU 22, the process validates the external keyboard 20, the proceeds to the next step 106. Here, validation means that the external keyboard 20 is enabled for communication, or that the external keyboard 20 is activated.

Step 106 determines whether there are data or commands including the retransmit request command RESEND from the external keyboard 20. If there is neither data nor a command from the external keyboard 20, the process proceeds to step 108 for invalidating the external keyboard 20, and then to step 110 where it is determined whether there are commands or data from the built-in keyboard 18. Here, if there is neither a command nor data from the built-in keyboard 18, it returns to step 102. However, if there is either a command or data from the built-in keyboard 18, it proceeds to the next step 112 for once storing this command or data in the buffer for host 36. In the next step 114, the command or data is taken out and output to the CPU, and the process returns to step 102.

This allows the built-in keyboard 18 to be validated, as necessary, even in a state where the external keyboard 20 is attached.

On the other hand, in case that the decision in step 106 is positive, the process proceeds to step 116 for receiving a command or data from the external keyboard 20, and then proceeds to the next step 118. In step 118, it is determined whether the command or data from the external keyboard 20 is reliably received. If not (the command or data has an error), the process proceeds to step 124 for once storing in the buffer for external input means 38 RESEND command which is a retransmit request command, and then proceeds to step 126. In case that the decision in step 118 is positive, the process proceeds to the next step 119 for determining whether the command has been received. If the decision in step 119 is negative, or if data has been received, the process proceeds to step 132. However, if the decision is acknowledged, it proceeds to the next step 120 for determining whether the received command is the retransmit request command RESEND. If it is, in step 122, the process stores in the buffer for the external input means 38 the command or data which the CPU 22 previously sent to the external keyboard 20, and proceeds to step 126.

In step 126, the transmission of a signal is notified to the external keyboard 20. In this case, this notification of signal transmission is attained by turning the clock line to "1" (enabled) and the data line to "0", which connect the keyboard controller with the external keyboard 20. This is in preparation for the sending of data.

In the next step 128, the external keyboard 20 is validated, and the process proceeds to the next step 130. In step 130, the process sends the command or data which is stored in the buffer to the external keyboard 20 for external input means 38 in step 122 or 124, then invalidates the external keyboard 20 in the next step 126, and returns to step 120.

On the other hand, if the command received in step 116 is not the retransmit request command RESEND, the decision in step 120 is negated and the process proceeds to step 132.

In step 132, the command or data from the external keyboard 20 is stored in the buffer for host 36. In the next step 134, the process outputs the command or data stored in the buffer for host 36 to the CPU 22, and returns to step 102.

Thus, if there is a command or data from the external keyboard 20, and the command or data cannot be successfully received, the retransmit request command RESEND is sent to the external keyboard 20. If it is properly received, and it is the retransmit request command RESEND, the command or data which was previously sent to the external keyboard is retransmitted. If the command is one other than the retransmit request command RESEND, such command other than RESEND is sent to the CPU 22. If data is received, the data is sent to the CPU 22 as in the case of a command other than RESEND.

On the other hand, if there is a command including the retransmit request command RESEND or data from the CPU 22, and the decision in the above step 102 is positive, the process proceeds to step 204 for taking in the command or data from the CPU 22. In the next step 206, it is determined whether it has been successfully taken in (no error in the command or data).

Commands from the CPU 22 other than the retransmit request command RESEND include, for example, one for selecting scan code tables, one for setting a wait for key-in, and one for setting a hold time for recognizing the pressing of a key. A scan code table is a table defining which character code should be output in correspondence to a key on the keyboard. In an ordinary keyboard, a plurality of characters are caused to correspond to one key, and can be selected by a function key. There are three tables for one keyboard.

The term of "setting of wait for key-in" means the setting of how much character data should be outputted in a unit time period when a key is continuously pressed.

The term of "setting of hold time to recognize pressing of a key" means the setting of a certain period of time for making invalid pressing of a key if the key is instantaneously pressed, and for outputting data if a key is continuously pressed for such certain period of time.

In case that the taking-in of a command or data in step 206 is unsuccessfully terminated, the process proceeds to step 212 for once storing the retransmit request command RESEND in the buffer for host 36, and then to step 214. On the other hand, if the decision in step 206 is positive, it proceeds to step 207 to determine whether a command has been received. If the decision in this step 207 is denied, that is, if data has been received, it proceeds to step 208. However, if the decision is positive, it proceeds to step 208 for determining whether the received command is the transmitted request command RESEND. If the decision in step 208 is affirmed, it proceeds to step 210 for once storing in the buffer for host 36 the command or data which was previously sent to the CPU 22 at the signal from the external keyboard 20, and then proceeds to step 214.

In step 214, the process outputs to the CPU 22 the command or data which was stored in the buffer for host 36 in step 210 or 212, and returns to step 102.

Thus, if there is a command or data from the CPU 22, and taking-in of the command is unsuccessfully completed, the retransmit request command RESEND is sent to the CPU 22. In case that the data or command is successfully taken in, and if the command is the retransmit request command RESEND, the command or data previously output to the CPU 22 is retransmitted. On the other hand, if the decision in step 208 is negative, the process proceeds to step 216.

In step 216, the external keyboard 20 is notified with the transmission of a signal. In the next step 218, the process validates the external keyboard 20, and proceeds to the next step 220. In this step 220, it temporarily stores the data or command from the CPU 22 other than the retransmit request command RESEND, which is taken in in the above step 204, in the buffer for external input means 38, outputs the data or command other than the retransmit request command RESEND to the external keyboard 20, in the next step 224 and then proceeds to the next step 226. In this step 226, it invalidates the external keyboard 20, and returns to step 102.

During the idle time after the execution of processing from step 2 16 to step 224, that is, during serial communication from the keyboard controller 28 to the external keyboard 20, internal processing for the built-in keyboard corresponding to the same command as one from the CPU 22 which is output to the external keyboard 20 in the above step 220 is performed in parallel to this serial communication (step 226). In this case, the reason why the same command is output from the CPU 22 to the built-in keyboard and the external keyboard 20 is to set both keyboards to the same state (the scan code table being used, key-in wait time, hold time, etc.). As the first interface 32 is a parallel interface, the keyboard controller 28 can communicate with the built-in keyboard 18 in parallel. However, as the second interface 34 is a serial interface, it communicates the external keyboard 20 in time-consuming serial communication. Thus, as described above, the internal processing for the built-in keyboard 18 is performed by utilizing the idle time caused from the time difference between two types of communication.

In the next step 228, the process waits for completion of processing for the built-in keyboard 18, and returns to step 102 once it is completed.

Thus, if there is a command from the CPU 22, and it is the retransmit request command RESEND, the command or data which was previously sent out to the CPU 22 is output again. If the command is not RESEND, it becomes possible that the command is transferred to the external keyboard 20 as it is, and that the internal processing for the built-in keyboard 18 can be performed by utilizing the idle time caused from the time difference between the communication to the built-in keyboard 18 and the external keyboard 20 so that both can be simultaneously enabled. If there is input of data from the CPU, it is processed in the same manner as that for a command other than RESEND.

As described above, according to this embodiment, the built-in keyboard 18 and the external keyboard 20 can be alternatively or simultaneously enabled as required.

Figure 5:
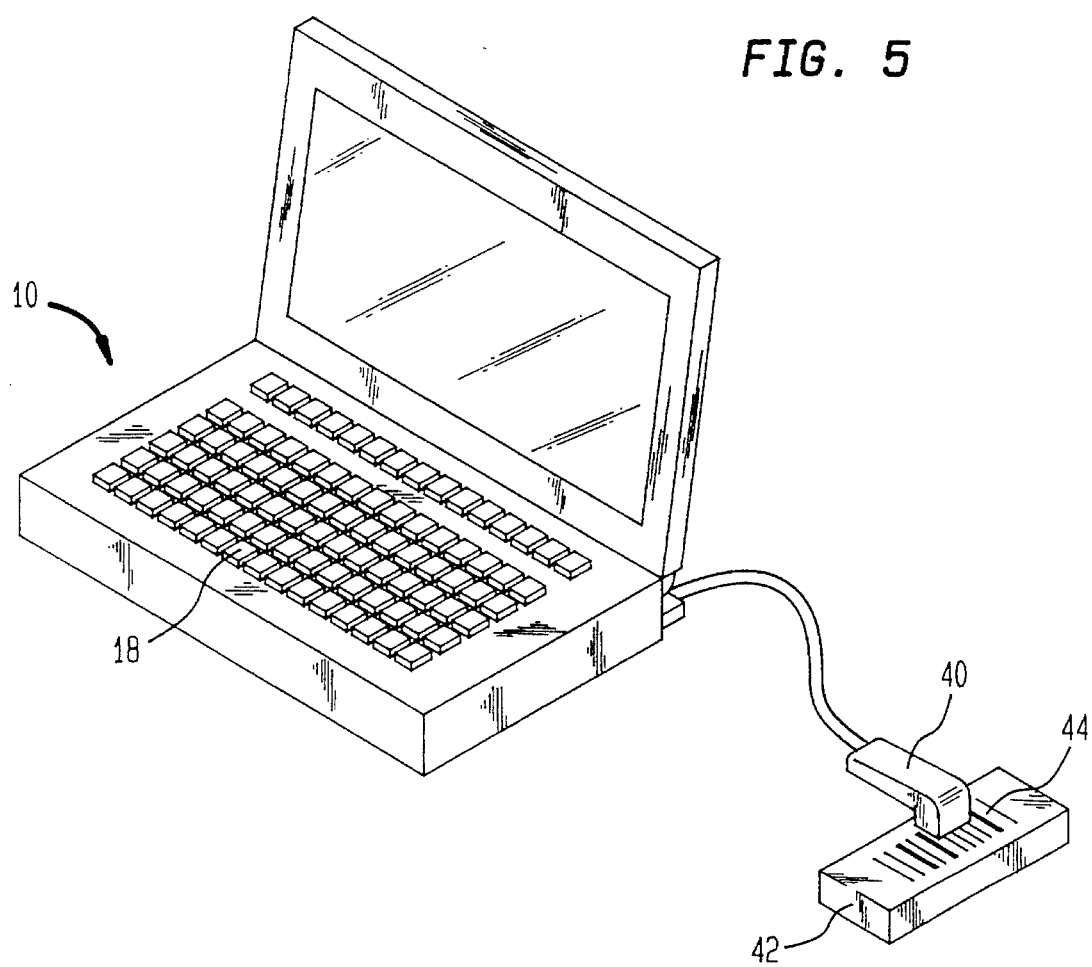
FIG. 5 is a perspective view showing the second embodiment.

Next the second embodiment of this invention will be described by referring to FIGS. 5 and 6. The second embodiment is characterized in that it is provided with a bar code reader 40 as the external input means in place of the external keyboard 20 of the above-described first embodiment. Other components are the same as those of the first embodiment.

Figure 6:
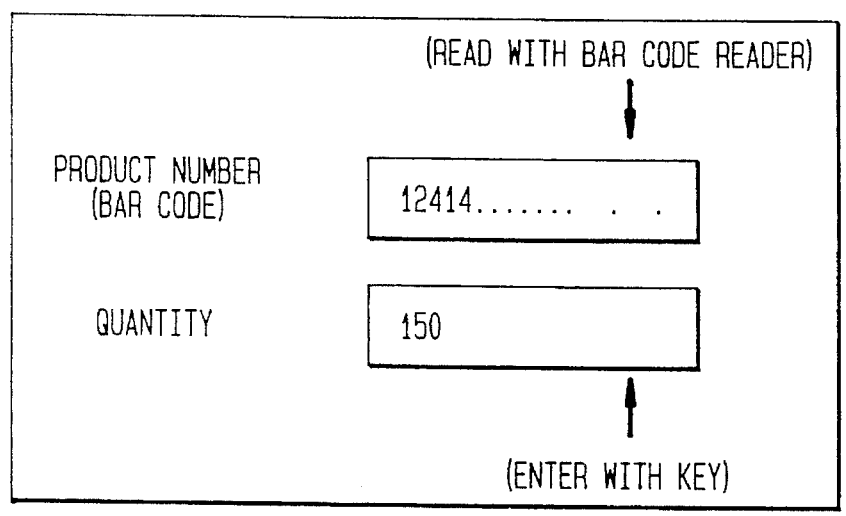
FIG. 6 is a diagram visually indicating reading of product number with a bar code reader and entering of quantity with a keyboard.

This second embodiment enables, as shown in FIG. 6, reading a bar code 44 attached on an item 42 with the bar code reader 40, and to enter its quantity with the keys on the built-in keyboard 18.

Therefore, the second embodiment allows a versatile small computer, such as a palm-top subnote type which is handy to use but is not necessarily adapted for inventory control purpose, to be used for such a purpose or the like.

In addition, the external input means attachable to the present invention's small computer is not limited to an external keyboard or a bar code reader for reading a bar code attached on goods or printed on a name card as exemplified in the first and the second embodiments, but may be other external input means such as a scanner (card reader) for reading information recorded in a magnetic recording area in an ID card or credit card.

Having thus described our invention, what we claim as new and desire to secure by Letters Patents is:

1. A data processing system for providing bi-directional communications between a processor and an external input means or a built in keyboard, said system comprising;

a processor for processing data, and a controller coupled to said processor through a system bus, and coupled to said built-in keyboard through a first interface and to said external input means through a second interface, wherein said controller comprises:

validating means for, in response to the absence of any data or a command from said processor to said built-in keyboard, for validating said external input means, first data transmission means for, in response to the presence of either data or a command from said external input means while said external input means is validated, receiving said data or said command from said external input means and transmitting it to said processor, invalidating means for, in response to the absence of any data or a command from said external input means while said external input means is validated, invalidating said external input means, second data transmission means for, in response to the presence of either data or a command from said built-in keyboard, for transmitting data or a command from said built-in keyboard;

means for, in response to a retransmission request command, retransmitting data or a command previously transmitted and stored in said controller to said processor or said external input means, wherein said data or said command stored in said controller is retransmitted directly from said controller to said external input means or said processor without being retransmitted from said processor or said external input means which previously transmitted said command or said data stored in said controller.

2. A data processing system as recited in claim 1, further comprising:

a housing on which said built-in keyboard is mounted, and in which said processor and said controller are incorporated therein, and a connecting means for detachably connecting said external input means to the controller in said housing.

3. A data processing system as recited in claim 1, wherein said external input means is one of either an external keyboard, a bar code reader, or a card reader.

4. A data processing system as recited in claim 1, wherein said external input means has a buffer for once storing data to be transmitted, and for retransmitting the stored data in response to a retransmit request command from said controller.

5. A data processing system as recited in claim 1, wherein a command sent to said processor is one other than the retransmit request command which requests said processor to retransmit at least one of either data or a command.

6. In a communications processing system having a processor for processing data and a controller connected to a built-in keyboard through a first interface and to an external input means through a second interface wherein said second interface for providing bi-directional communication between said processor and said external input means, a method of processing data and commands from said built in keyboard and said external input means, comprising the steps of:

validating said external input means in response to the absence of both data and a command from said processor to said built-in keyboard;

receiving data or a command from said external input means;

transmitting said data or said command to said processor in response to the presence of either said data or said command from said external input means in a state where said external input means is validated;

invalidating said external input means in response to the absence of both data and a command from said external input means; and transmitting data or a command from said built-in keyboard in response to the presence of either data or a command from said built-in keyboard; and retransmitting, in response to a return request command, data or a command previously transmitted and stored in said controller to said processor or said external input means, wherein said data or said command stored in said controller is retransmitted directly from said controller to said external input means or said processor without being retransmitted from said processor or said external input means which previously transmitted said command or said data stored in said controller.

7. A method as recited in claim 6, wherein when said controller receives a command other than a retransmit request command which requests said processor to retransmit at least one of either data or a command, said controller transmits the command or data received to said external input means, and wherein when said controller receives from said external input means either one of a command or data other than the retransmit request command, said controller transmits the command or data received to the processor.

8. A communication method for data processing recited in claim 6, wherein, in transmitting a command from said processor to said external input means, said controller translates the received command by utilizing the idle time resulting from the time difference in communications to said built-in keyboard said external input means, and executes said keyboard command for the built-in keyboard.

9. A communication method for data processing recited in claim 6, wherein, when said controller fails to reliably receive one of either data or a command from said processor, said controller transmits to said processor a retransmit request command which requests the retransmission of at least said one of either data or a command, and when said controller fails to reliably receive one of either data or command from said external input means, said controller transmits a retransmit request command to said external input means.

\* \* \* \* \*